United States Patent
Kindle et al.

(10) Patent No.: US 9,674,190 B2
(45) Date of Patent: *Jun. 6, 2017

(54) METHOD AND SYSTEM FOR DISTRIBUTING RESTRICTED MEDIA TO CONSUMERS

(71) Applicant: VUDU, INC., Santa Clara, CA (US)

(72) Inventors: Brian Kindle, Sunnyvale, CA (US); Gilbert Flamino, San Carlos, CA (US); Prasana Ganesan, Menlo Park, CA (US)

(73) Assignee: VUDU, INC., Santa Clara, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/722,787

(22) Filed: Dec. 20, 2012

(65) Prior Publication Data

US 2013/0283389 A1 Oct. 24, 2013

Related U.S. Application Data

(63) Continuation of application No. 11/558,872, filed on Nov. 10, 2006, now Pat. No. 8,364,792, which is a
(Continued)

(51) Int. Cl.
*G06F 15/177* (2006.01)
*G06F 15/16* (2006.01)
*H04L 29/06* (2006.01)
*G06F 17/30* (2006.01)
*H04N 7/173* (2011.01)
(Continued)

(52) U.S. Cl.
CPC ........ *H04L 63/10* (2013.01); *G06F 17/30017* (2013.01); *H04N 7/17318* (2013.01); *H04N 21/25891* (2013.01); *H04N 21/4227* (2013.01); *H04N 21/4331* (2013.01); *H04N 21/4755* (2013.01); *H04N 21/485* (2013.01); *H04N 21/632* (2013.01); *H04N 21/6547* (2013.01); *H04N 21/6582* (2013.01);
(Continued)

(58) Field of Classification Search
CPC ...... H04N 21/442; H04N 17/04; H04N 17/06; H04N 17/045
USPC .......... 709/231; 725/98, 100, 151, 132, 140, 725/152; 717/168, 174
See application file for complete search history.

(56) References Cited

U.S. PATENT DOCUMENTS 5,410,343 A * 4/1995 Coddington et al. ........... 725/99
6,154,633 A * 11/2000 Landgraf et al. ............. 725/151
(Continued)

*Primary Examiner* — Douglas Blair
(74) *Attorney, Agent, or Firm* — Bryan Cave LLP

(57) ABSTRACT

Techniques for distributing restricted media to consumers are disclosed. According to one aspect of the present invention, personalized settings (e.g., parameters or table) are managed in a primary client device associated with a user. A copy of the personalized settings is maintained in a server. When the primary box is replaced, a copy of the personalized settings is uploaded to a different client device that is configured to respond to the personalized settings. Data pertaining to titles in a personal vault is preloaded. When there is an order for a release that is restricted for distribution over an open network, data pertaining to such a release is also loaded. As a result, the subscriber sees the familiar settings on the different client device and would not miss any release while the primary box is being replaced or repaired.

20 Claims, 12 Drawing Sheets

Related U.S. Application Data continuation-in-part of application No. 11/075,573, filed on Mar. 9, 2005, now Pat. No. 8,219,635.

(51) Int. Cl.

| | |
|---|---|
| *H04N 21/258* | (2011.01) |
| *H04N 21/4227* | (2011.01) |
| *H04N 21/433* | (2011.01) |
| *H04N 21/475* | (2011.01) |
| *H04N 21/485* | (2011.01) |
| *H04N 21/63* | (2011.01) |
| *H04N 21/6547* | (2011.01) |
| *H04N 21/658* | (2011.01) |
| *H04N 21/845* | (2011.01) |
| *H04L 29/08* | (2006.01) |

(52) U.S. Cl.
CPC ..... *H04N 21/8456* (2013.01); *H04L 65/4084* (2013.01); *H04L 67/306* (2013.01)

(56) References Cited

U.S. PATENT DOCUMENTS

| | | | | |
|---|---|---|---|---|
| 6,263,504 | B1* | 7/2001 | Ebisawa | 725/101 |
| 6,804,719 | B1* | 10/2004 | Cabrera et al. | 709/226 |
| 7,010,720 | B2* | 3/2006 | Maeda et al. | 714/5.1 |
| 7,027,460 | B2* | 4/2006 | Iyer et al. | 370/429 |
| 7,069,332 | B2* | 6/2006 | Shibata et al. | 709/231 |
| 7,197,541 | B1* | 3/2007 | Skinner et al. | 709/216 |
| 2002/0154892 | A1* | 10/2002 | Hoshen et al. | 386/87 |
| 2004/0025186 | A1* | 2/2004 | Jennings et al. | 725/93 |
| 2004/0148634 | A1* | 7/2004 | Arsenault et al. | 725/89 |
| 2005/0010616 | A1* | 1/2005 | Burks | 707/204 |
| 2005/0015814 | A1* | 1/2005 | Yun | 725/132 |
| 2005/0108414 | A1* | 5/2005 | Taylor et al. | 709/231 |
| 2005/0125460 | A1* | 6/2005 | Yu et al. | 707/203 |
| 2005/0210525 | A1* | 9/2005 | Carle et al. | 725/105 |
| 2005/0262147 | A1* | 11/2005 | Lee | 707/104.1 |
| 2005/0262546 | A1* | 11/2005 | Murase et al. | 725/131 |
| 2006/0008256 | A1* | 1/2006 | Khedouri et al. | 386/124 |
| 2006/0020828 | A1* | 1/2006 | Aihara et al. | 713/193 |
| 2006/0031537 | A1* | 2/2006 | Boutboul et al. | 709/228 |
| 2006/0036611 | A1* | 2/2006 | Rothschild | 707/10 |
| 2006/0078307 | A1* | 4/2006 | Kelly | 386/107 |
| 2006/0136597 | A1* | 6/2006 | Shabtai et al. | 709/231 |
| 2006/0190615 | A1* | 8/2006 | Panwar et al. | 709/231 |
| 2006/0200413 | A1* | 9/2006 | Kessel et al. | 705/50 |
| 2006/0215988 | A1* | 9/2006 | Tol et al. | 386/83 |
| 2007/0101399 | A1* | 5/2007 | Yun | 725/151 |
| 2007/0157281 | A1* | 7/2007 | Ellis et al. | 725/134 |
| 2007/0245392 | A1* | 10/2007 | Shen | 725/115 |
| 2008/0091840 | A1* | 4/2008 | Guo et al. | 709/231 |
| 2008/0148323 | A1* | 6/2008 | White et al. | 725/88 |
| 2009/0300673 | A1* | 12/2009 | Bachet et al. | 725/31 |
| 2010/0005496 | A1* | 1/2010 | Ellis et al. | 725/87 |
| 2012/0144073 | A1* | 6/2012 | Smith et al. | 710/33 |

* cited by examiner

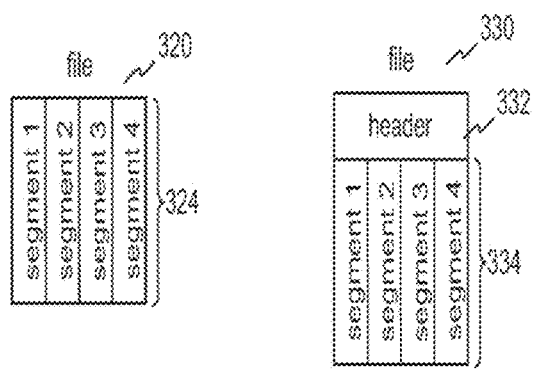
FIG. 3B
FIG. 3C
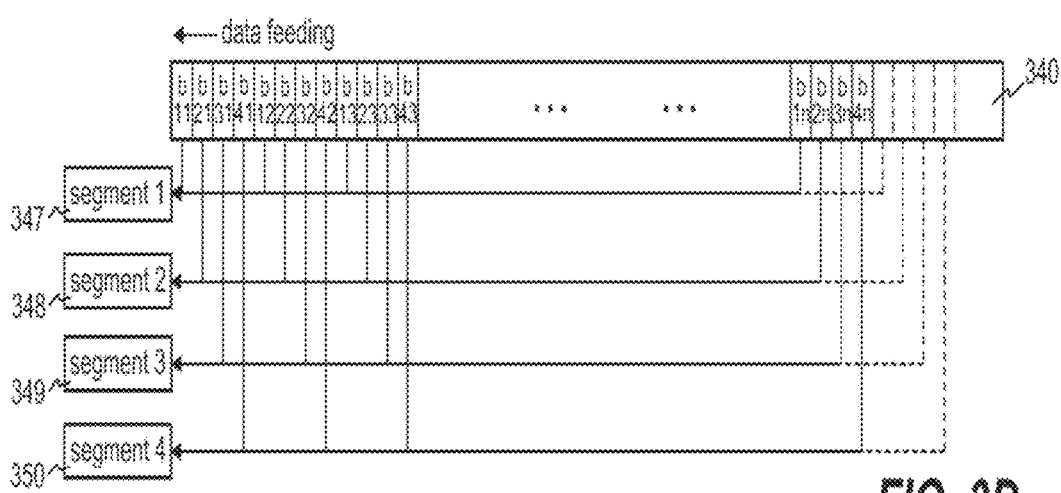
FIG. 3D

| 530 | 532 | 534 | 536 | 538 | 540 | 542 |
|---|---|---|---|---|---|---|
| Local machine | IP Address | Time-fill (1~5000) | title1 | title2 | ... | title 5000 |
| Box 1 | address 1 | Program1 | seg1 seg3 | seg4 | | seg4 |
| Box 2 | address 2 | Program2 | seg3 seg4 | seg1 | | |
| Box 3 | address 3 | Program3 | seg2 seg3 | seg4 | | |
| ... | | | | | | |
| Box N | address n | Program4 | seg1 seg3 | seg3 | | seg1 |

| | Self | 306-n | 306-3 | 306-1 |
|---|---|---|---|---|
| seg1 | IPA1 | | | |
| seg2 | | IPA2 | | |
| seg3 | | | IPA3 | |
| seg4 | | | | IPA4 |

| | box1 | back up | box2 | back up | box3 | back up | box4 | back up |
|---|---|---|---|---|---|---|---|---|
| seg1 | IPA1 | IPA | | | | | | |
| seg2 | | | IPA2 | IPA | | | | |
| seg3 | | | | | IPA3 | IPA | | |
| seg4 | | | | | | | IPA4 | IPA |

FIG. 5C

METHOD AND SYSTEM FOR DISTRIBUTING RESTRICTED MEDIA TO CONSUMERS

CROSS-REFERENCE TO RELATED APPLICATION

This is a continuation in part of U.S. application Ser. No. 11/558,872, entitled "Method And System For Distributing Restricted Media To Consumer" filed Oct. 10, 2006, and issued as U.S. Pat. No. 8,364,792 on Jan. 29, 2013. That application is a continuation-in-part of U.S. application Ser. No. 11/075,573, entitled "Continuous data feeding in a distributed environment" filed Mar. 9, 2005, issued as U.S. Pat. No. 8,219,635 on Jul. 10, 2012, and by at least one of the co-inventors herein.

BACKGROUND

1. Technical Field

The present invention relates generally to the area of delivering multimedia services over the Internet, and more particularly to techniques for distributing restricted media to client machines associated with consumers, wherein the restricted media means those electronic versions of multimedia contents being restricted to be released over a data network only within a limited time.

2. Description of the Related Art

Co-pending U.S. application describes an improved media service that is provided using distributed sources to fulfill an order of a title. Data pertaining to a title (e.g., a movie) is segmented into decimated segments, each of the segments is pre-cached in one or more client machines. When an order is received in a server, the server is configured to determine what other client devices that shall be designated to provide needed data segments to fulfill the orders. According to instruction data from the server, the designated client machines upload the relevant data segments to the ordering client machine.

At the same time, each of the client machines associated with a subscriber or a user has its own setting. The personal settings for a receiver can not be more important because each user has his/her own settings as to which types of movies/music to receive or not to receive, which ones are more preferable than others, and etc. In some cases, the personal settings define how a local personalized library in the library being offered is created, formed and maintained. These settings provide a convenient environment to access the services more effectively and more personally.

In commercial applications, each of the client machines may need to be taken off the network for various reasons (e.g., repairing). A simple immediate replacement of the machine would not work because the replacement does not have the personalized setting and updated data segments. On the other hand, depending on the time the particular machine has been offline, the machine could be completely obsolete with respect to other client machines by the time it is back online.

During the time a client machine is offline, there may be new releases that are only available for a limited time. When the client machine is back online, some of the new releases may not be available. It would be disappointing to the user of the client machine that some of the new releases are not available because of a brief breakdown of the client machine.

There, thus, is a need for techniques that enable a client machine to perform as if it is updated when it is returned to a network.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to techniques for distributing restricted media to consumers. According to one aspect of the present invention, personalized settings (e.g., parameters or table) are managed in a primary client device associated with a user. A copy of the personalized settings is maintained in a server. When the primary box is replaced, a copy of the personalized settings is uploaded to a different client device that is configured to respond to the personalized settings. As a result, the subscriber sees the familiar settings on the different client device.

According to another aspect of the present invention, some of the personalized settings pertain to a vault associated with the subscriber. Media titles (movies or music) in the vault may be purchased or rented and shall be accessed whenever and wherever the subscriber may desire. Although these titles in the vault may be watched, making a copy on an optical medium (e.g., a DVD disc) would require that the data for a title is all locally available. To ensure instant access to the titles in the vault, a service place that is designated to ship a replacement to a user, the replacement device or box is preloaded with data pertaining to the titles. As a result, when the replacement is received, a user thereof would feel that the original box is back.

According to still another aspect of the present invention, if it is determined that a user has ordered a release that has a restricted period for distribution over an open network (e.g., the Internet), the data for the release may be loaded to the replacement box before the replacement box is shipped to the user or the replacement box is set to have a priority to download the data for the release if such a release is still available for distribution over the network. In one embodiment, the data for the release is fetched simultaneously from a number of designated client machines, each is configured to catch some of the data. As a result, one embodiment of the present invention resolves the issue of how to distribute restricted media to consumers.

Other aspects of the invention will become apparent and appreciated by those skilled in the art from the detailed description herein. The present invention may be implemented in number of ways including as a process, a method or a system. Several embodiments of the invention are discussed below. According to one embodiment, the present invention is a method for distributing restricted media to consumers, the method comprises: looking up an account associated with a user after it is confirmed that a primary box with the user needs to be replaced or repaired; configuring a new box in accordance with personalized settings retained in the account, the personalized settings including at least definitions of look and feel of a graphic user interface, a list of viewed titles and a personal vault; and loading data pertaining to titles in the personal vault into the new box; and loading data pertaining to a release into the new box without using an open network, if the user has ordered the release that is going to be restricted for distributing online when the new box is received by the user.

According to another embodiment, the present invention is a method for distributing restricted media to consumers, the method comprises looking up an account associated with a user after it is confirmed that a primary box with the user needs to be replaced or repaired; determining whether a new box is placed online; uploading a copy of personalized settings retained in the account to the new box after it is determined that the new box is placed online, the personalized settings including at least definitions of look and feel of a graphic user interface, a list of viewed titles and a personal vault; and uploading data pertaining to titles in the personal vault into the new box over a network; determining whether the user has ordered a release and when the release is going to be restricted for distributing online; uploading data pertaining to the release into the new box over the network when the release is still available for distribution over the network; and uploading data pertaining to the release into the new box before the new box is released to the user after it is determined that the release is likely to be restricted for distribution over the network when the new box is received by the user.

According to still another embodiment, the present invention is a system for distributing restricted media to consumers, the system comprises a primary box configured to manage personal settings for an account associated with a user, wherein the personalized settings dictate a graphic user interface from which the user accesses various media services; and a service place controlled by a service provider providing media services, after notified that the primary box is no longer working and needs to be replaced, performing operations of: looking up an account associated with the user; configuring a new box in accordance with personalized settings retained in the account, the personalized settings including at least definitions of look and feel of a graphic user interface, a list of viewed titles and a personal vault; and loading data pertaining to titles in the personal vault into the new box; and loading data pertaining to a release into the new box without using an open network, if the user has ordered the release that is going to be restricted for distributing online when the new box is received by the user.

Accordingly one of the objects of the present inventions is to provide techniques for distributing restricted media to consumers.

Other objects, features, advantages, benefits of the invention will become more apparent from the following detailed description of a preferred embodiment, which proceeds with reference to the accompanying drawings.

BRIEF DESCRIPTION OF THE DRAWINGS

The invention will be readily understood by the following detailed description in conjunction with the accompanying drawings, wherein like reference numerals designate like structural elements, and in which:

FIG. 3B shows an embodiment in which a file is being organized or fragmented in terms of four segments;

FIG. 3C shows another embodiment in which a file is being organized or fragmented in terms of a header and four segments, where the header is always locally cached;

FIG. 3D shows a data stream representing a file or a majority of a file, wherein the file is divided into four segments.

FIG. 4A shows an exemplary display including a browsing panel providing several search schemes to facilitate a search process;

FIG. 5A, there shows exemplary source information shown as a map illustrating how a library of 5000 movie titles is distributed across N boxes.

FIG. 5B shows a source information map corresponding to FIG. 5A;

FIG. 5C shows exemplary source information with backup boxes in a table that includes a backup identifier (shown as an IP address) for each of the designated boxes;

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments, if any, do not inherently indicate any particular order nor imply limitations in the invention.

Figure 1:
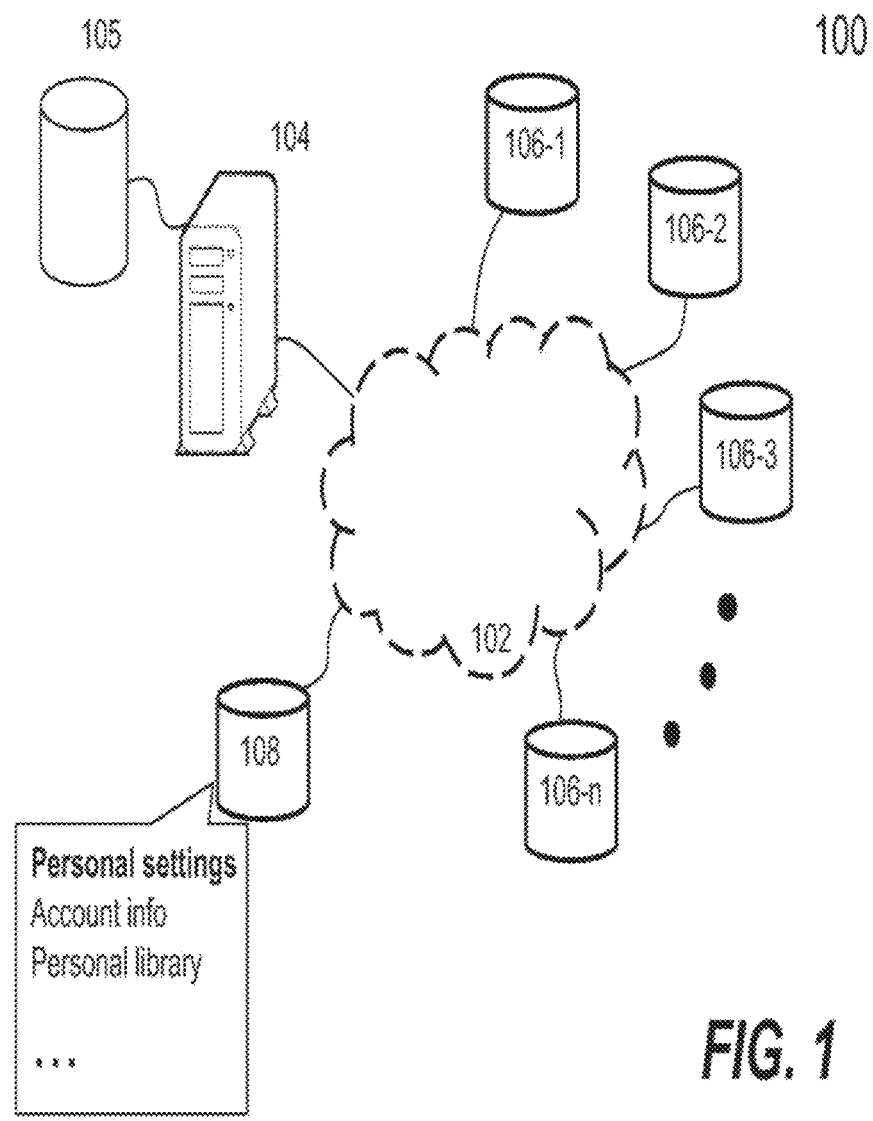
FIG. 1 shows an exemplary configuration in which the present invention may be practiced.

Referring now to the drawings, in which like numerals refer to like parts throughout the several views. FIG. 1 shows an exemplary configuration 100 in which the present invention may be practiced. Coupled to the network 102, there are a server 104 and a plurality of local machines or boxes 106-1, 106-2, 106-3, . . . 106-n and 108. Each of the boxes

106-1, 106-2, 106-3, . . . 106-n and 108 includes or connected to a display screen (not shown) and a local storage space (not separately shown). The boxes 106-1, 106-2, 106-3, . . . 106-n and 108 may be located remotely with respect to each other. With each of the boxes 106-1, 106-2, 106-3, . . . 106-n and 108, a subscriber or a user may receive multimedia services from the server 104 that is typically operated by a service provider.

It is assumed that the box 108 is a primary box from which a user orders and receives services from the server 104. The box 108 may be located in a residence of the user. Typically, the user maintains an account with the server 104. From time to time, the user may update the account from the box 108. Whenever there is a change to the account, a copy of the account information maintained in the server 104 is updated accordingly.

According to one embodiment of the present invention, the user is allowed to establish his or her own account preferences that include, but not limited to, look and feel of a graphic user interface, a list of viewed titles and ratings, a list of orders, and a personal vault. A graphic user interface provides an environment in which the user interacts with the media services being offered. A list of viewed titles and ratings includes a list of movie titles that the user has viewed or browsed in the past, and corresponding ratings from others or the user self. A list of orders may include movie titles the user desires to order (e.g., a new title to be released on a predefined date). A vault or a personal library includes a list of movies that may have been purchased or rented by the user. Presumably, any of the titles in the vault may be accessed by the user at any time or in any way (e.g., re-watching a movie or making a copy on a DVD disc).

At the same time, the primary box is receiving data pertaining to new releases every day. When the primary box is taken offline for whatever reasons, the next time the user logs on, the user shall access his or her account preference. A new box (e.g., a replacement of the primary box or a repaired box) shall appear updated and personalized to include instant access to a personalized library or access to any new releases that may have been placed order for. One of the features, benefits and advantages in the present invention is to provide a mechanism that allows the user to access his or her account preference when a new box is used.

Figure 2A:
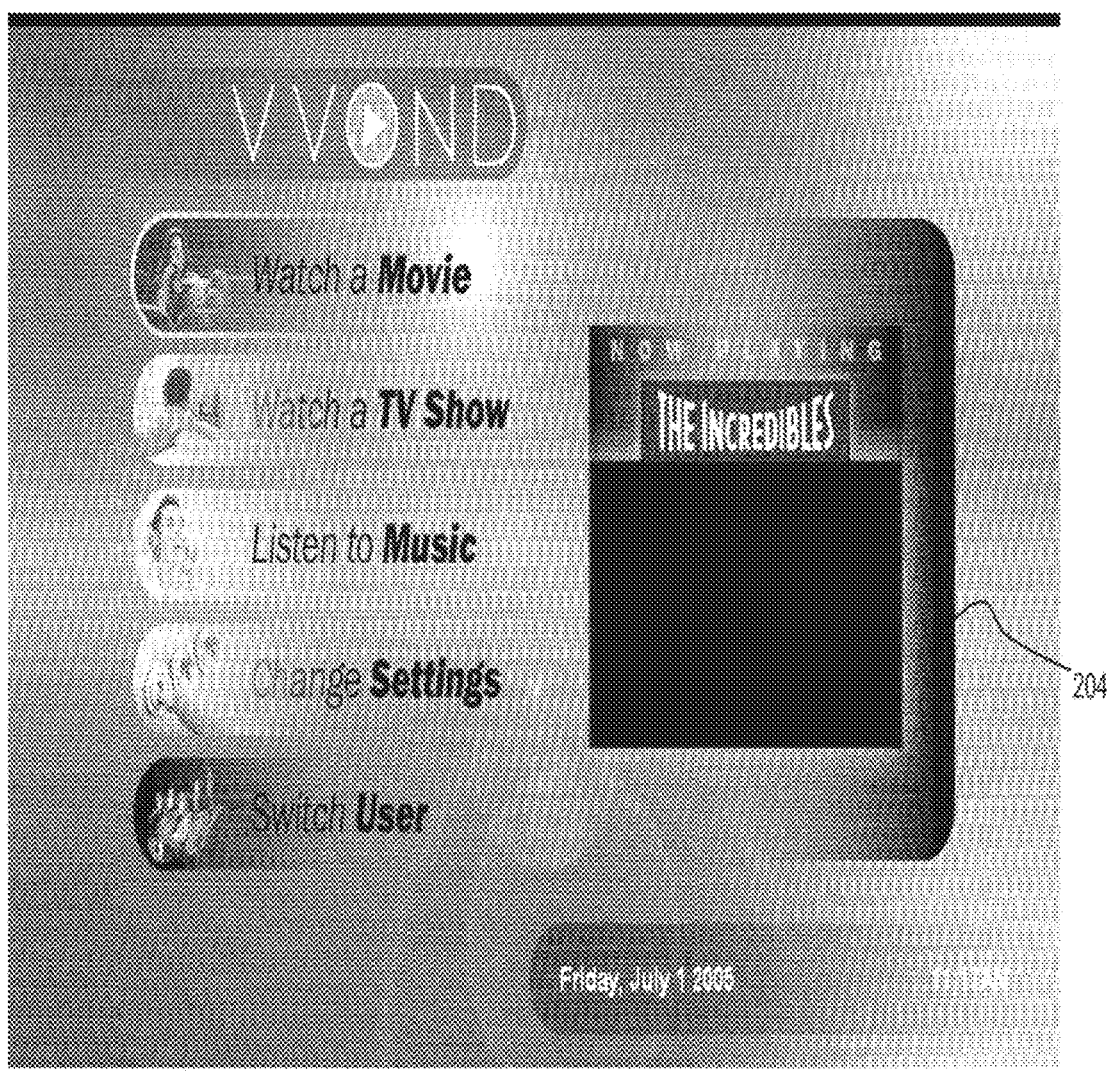
FIG. 2A shows an exemplary display showing a list of services provided by a service provider.

FIGS. 2A-2D show exemplary displays pertaining to a user account. FIG. 2A shows a display 200 providing a list 202 of services provided by a service provider. The display 200 and any subsequent displays are image displays on a display screen that may be part of a computing device or a television, or coupled to a device. It should be noted that it is defined herein a display screen or a screen is a physical display apparatus, such as a CRT or LCD television commonly seen and available. A screen display or simply a display is a displayed image or a displayed window presented on the display screen.

The display 200 shows that a user may enter into any of five areas: Watch a Movie, Watch a TV Show, Listen to Music, Change Settings, and Switch User. As the name suggests, Watch a Movie allows a user to order a movie from a plurality of titles in a library, Watch a TV Show and Listen to Music allow a user to choose a particular channel for TV broadcasts and music, live or archived, Change Settings is provided to change various settings for the account from which the user may access the services, and Switch User allows a change from one user account to another. Some of the areas will be detailed below.

Figure 2B:
FIG. 2B shows an exemplary display, also referred to as a home display, that may be provided after the user enters Watch a Movie of FIG. 2A.

Next to the list 202, according to one embodiment, the display 200 includes a smaller display window 204, referred to as an iconic display, showing whatever is being played or promoted. It is assumed that a user enters Watch a Movie. FIG. 2B shows an exemplary display 210, also referred to herein as a home display, after the user enters Watch a Movie. The display 210 includes a functional panel 212 and a notification space 214. The functional panel 212 includes various tools 216 to facilitate a user to manage personalized lists and/or minor accounts if necessary, search a movie and change settings, etc. In addition, the functional panel 212 includes a list of recent movies 218 that the user has viewed. In accordance with FIG. 2A, the movie that is currently being played is displayed in an iconic display 220 that is also included in the functional panel 212.

The notification space 214 is provided to display various promotions. The embodiment as shown in the display 210 shows that there are eight movies being promoted. In another embodiment, the notification space 214 is used to advertise various services and products. These services and products may be highly related to the interests or characteristics of the account owner. When an account is established for the owner, a list of questions may be generated for the owner to answer. The answers from the owner to the questions are assembled and analyzed to determine the interests or characteristics of the owner. For example, some answers indicate that the owner is very much into golfing, the notification space 214 may be configured to display services and products somehow related to golfing. The interests or characteristics of the owner may also be determined from an analysis of the owner's behavior in interacting with the system, together with additional information provided to the system about the behavior of other owners.

As shown in FIG. 2B, the movies being promoted in the notification space 214 are in the form of movie posters. One of the advantages of showing movie posters instead of titles in words is to make a coincident impact on audience as a movie poster is a single visual image representation of a movie. Movie studios or production companies, large or small, promote their movies with movie posters so that the general audience gets to know a movie quickly from a corresponding movie poster. According to one implementation, each of the displayed movie posters in the notification space 214 is embedded with a link. Once one of the displayed movie posters is selected, a full review of the movie is provided.

Figure 2C:
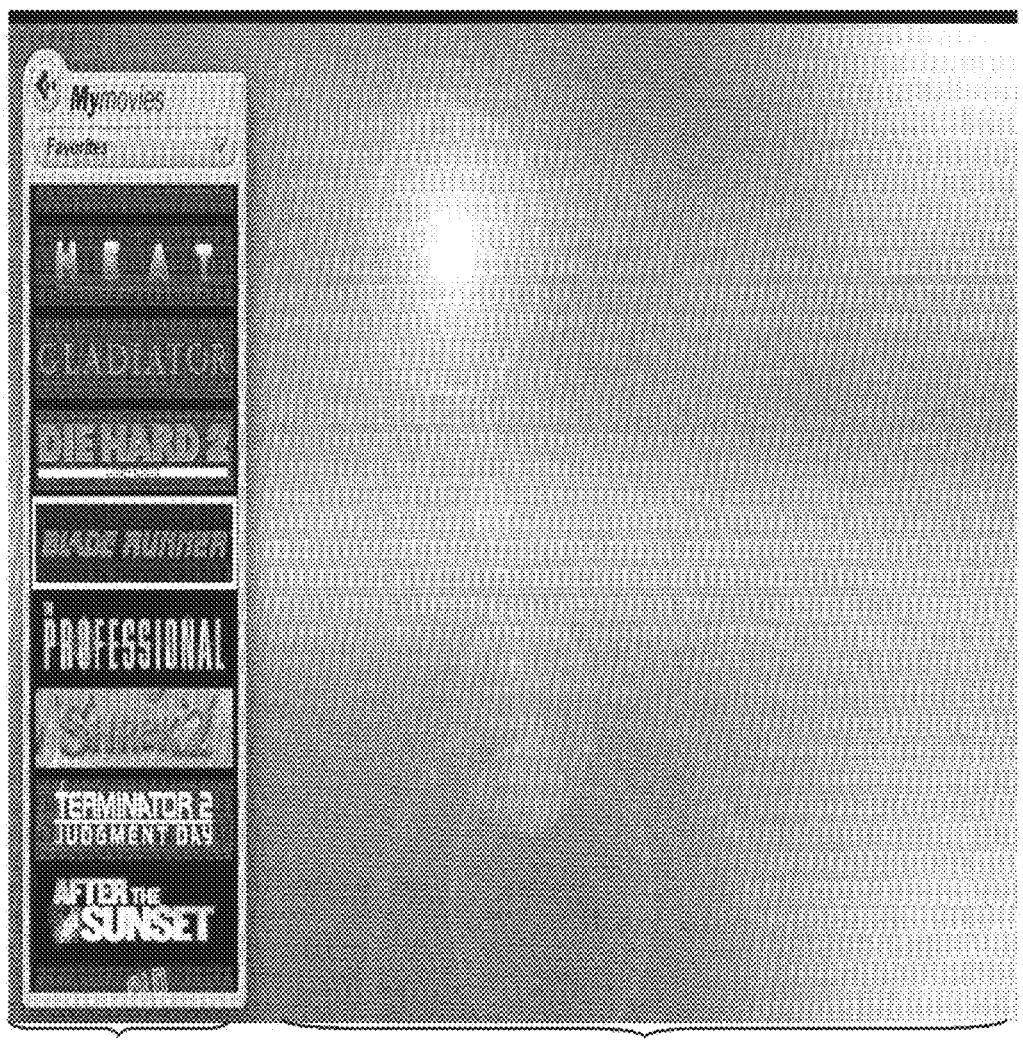
FIG. 2C shows a display including a list of movie titles in My Movies, wherein the movie titles are presented respectively in movie banners.

My Movies, Browse Movies, and Search Movies in the functional panel 212 provide respective mechanisms for a user to locate a movie. My Movies is a personal directory providing a vault to store or bookmark one or more movies favorite to the owner of the account. According to one embodiment, when a user is interested in a movie when browsing the library offered, the movie may be bookmarked in My Movies so that the user can always go back to My Movies to readily place an order for the movie. FIG. 2C shows a display 220 including a list 222 in My Movies. Instead of using words for a title of a movie, the display 220 shows a list of movie banners, each banner representing a visual image of the movie. A movie banner may be part of a corresponding movie poster or a redesigned banner that reflects certain characteristics of the movie.

As shown in the list 222 in My Movies, each of the movie banners shows a title in substantially similar style, font and background as in the corresponding movie poster. One of the purposes of using at least part of a movie poster or banner instead of texts to indicate a movie is to create a coincident impact on the audience. In certain aspect, a movie banner is equivalent to a visual "logo" for a movie. A user may browse or scroll the list of movie banners in the list 222. Each of the movie banners in the list 222 is embedded with a link that brings up a full review of the movie when one of the displayed movie banners is selected.

After a certain arrangement with the service provider is made, the user may gain a limited right to access one or more movies in My Movies repeatedly without charges or with a nominal change. According to one embodiment, the movies in My Movies are purchased and owned by the account owner. The account owner may access any one of the movies in My Movies at any time without charges.

Figure 2D:
FIG. 2D shows a display including a viewing history in My Movies to show what movie a user has ordered or watched.

FIG. 2D shows a display 230 including a viewing history 232 in My Movies. The viewing history 232 is provided to record what movie the user has ordered or watched. Similar to the favorite list 222 in FIG. 2C, the viewing history 232 shows a list of movie banners reflecting that these movies have been watched or ordered. Each of the movie banners in the list 232 is also embedded with a link that leads to a full review of the movie when activated. Such a favorite list 222 shall be also immediately available when the account owner logs into the account from a box other than the primary one.

Figure 3A:
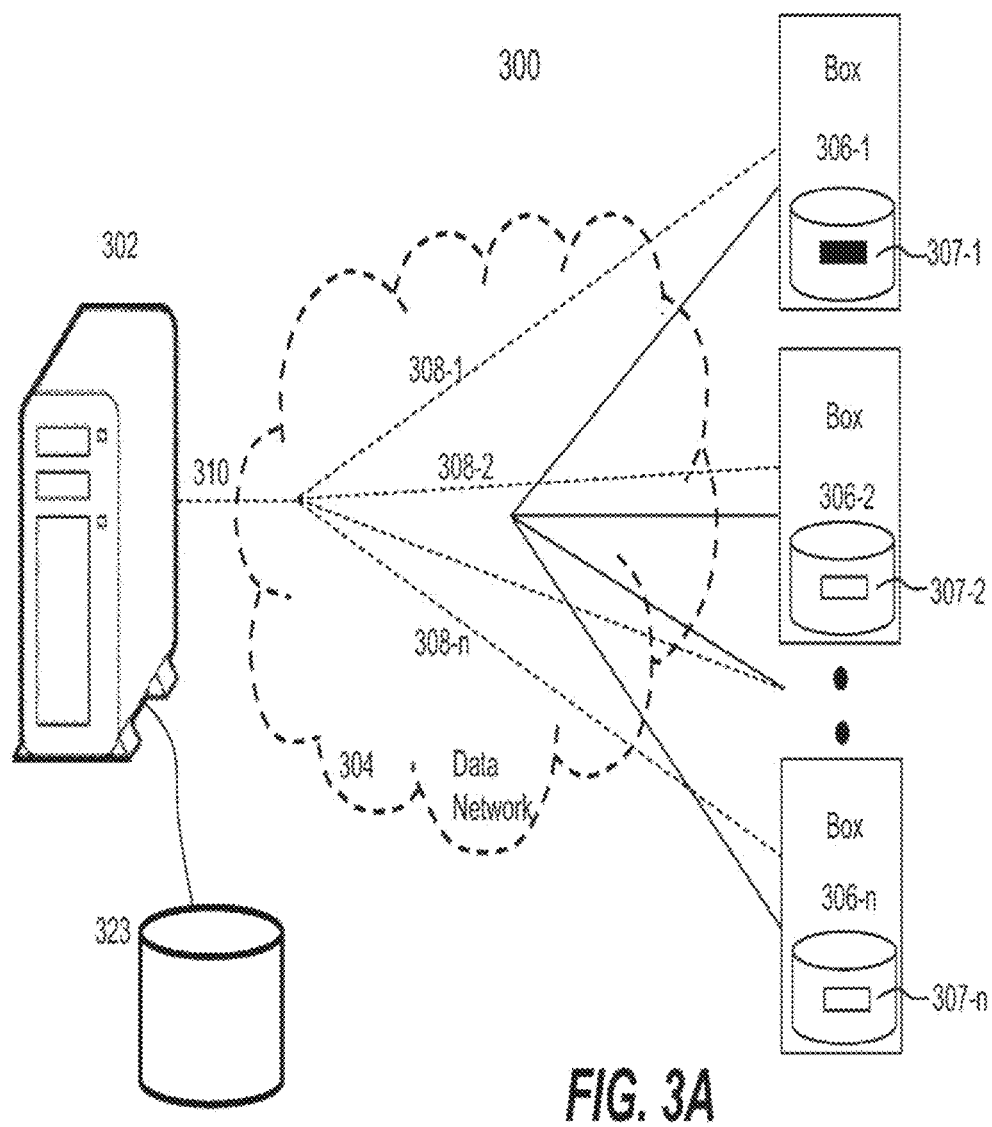
FIG. 3A shows an exemplary configuration to implement one embodiment of the present invention.

FIG. 3A shows an exemplary configuration 300 to implement one embodiment of the present invention. One of the features, benefits and advantages of the configuration 300 is the underlying mechanism that utilizes the computing capacity as well as the bandwidth on the client side to deliver media services while, at the same time, providing centralized services and management.

For example, the architecture 300 may be configured to deliver non-prerecorded programs such as live broadcasts by a multicasting protocol. The server 302 receives orders from some of the subscribers (e.g., for boxes 306-1 and 306-n) for a broadcasting event. When the event comes, the server 302 receives a streaming feed from a source (e.g., a televised site). The streaming is then delivered by the server 302 via the network path 310 to 308-1 and 308-n to the ordering boxes 306-1 and 306-n. As the subscriber for the box 306-2 did not order the event, the box 306-2 will not receive the streaming from the server 302. It can be appreciated that the number of recipients for the program does not affect the performance of the server 302 or demands higher bandwidth because the program is being multicast to the ordering boxes.

At the same time, the architecture 300 can provide prerecorded programs such as movies without demanding higher bandwidth when servicing a large number of boxes. In operation, the server 302 is not responsible for delivering the content in response to a request from an ordering box (e.g., 306-1), and instead is configured to provide source information as to where and how to retrieve at least some of the content from other boxes. In other words, some of the other boxes 306-2, 306-3, . . . 306-n are respectively configured to supply part or all of the content to each other.

Data for a title is represented in terms of segments. The segments for each title in a library are distributed among the boxes in service. When the box 306-1 is used to order one of the titles in a library, the request is sent to the server 302 via the network path 308-1 and 310. The server 302 is configured to determine which other boxes are most appropriate to be the suppliers for providing the distributed segments. Either the server 302 causes the suppliers to contact the ordering box 306-1 to receive the needed segments or the ordering box 306-1 initiates communication with the suppliers upon receiving a response form the server 302, where the response includes information about the suppliers. In one embodiment, the information includes designation information (e.g., network addresses) as to who are the suppliers, security information as to how to decrypt the data, and other information to facilitate the playback of the ordered title.

For convenience, it is assumed herein that a file represents a collection of data pertaining to a movie title. When an order for a title is placed, the corresponding data of the file must be available for playback. According to one aspect of the present invention, only a beginning portion (referred to as a "header") and possibly one or more segments of the file are locally cached in a box. Such locally cached segments are referred to as residing segments, while segments not residing locally are referred to as distributed objects or segments. When a title is selected, the header of the corresponding file is instantly played back. During the time the header is being played, the distributed objects corresponding to the title are retrieved simultaneously from other designated boxes. When the header is finished, the received parts of the distributed segments being streamed in from other boxes are combined with the residing segments for the title, if any, to enable a continuous playback. Depending on the popularity and concurrent demand for a particular title, the number of residing objects may be increased or decreased to control the dependency of each box on other boxes for playback. Typically, the more residing objects for a title a box has, the more distributed copies of the title there are in the entire distributed system and thus the less dependency of the ordering box on the other boxes.

In one embodiment, the header is always played first to ensure instant playback. In another embodiment, the header size is reduced to zero, in which case, a time-fill program may be played first to provide a time frame that is sufficient enough to fetch and assembly the beginning data portion of the segments either locally available or from other boxes. Depending on implementation, the time-fill program may include one or more trailers related to the title being ordered, various notifications/updates or commercial programs.

Referring to FIG. 3B, there shows an embodiment in which a file 320 is being organized or fragmented in terms of four segments 324. In general, the file 320 representing a collection of all data pertaining to a title may be divided into any number of segments in consideration of a required transmission rate (e.g., related to the encoding and decoding rates for successful playback), and the minimum uploading and downloading capabilities of a network. FIG. 3C shows another embodiment in which a file 330 is being organized or fragmented in terms of a header 332 and four segments 334, where the header 332 is always locally cached. One of the advantages of having a header locally cached is to facilitate an instantaneous playback after a movie is ordered. While the header is being played back, the needed segments are retrieved from other designated boxes. It can be appreciated the length of a header may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

Regardless whether a header is used or not, a file or a majority of a file will be fragmented and the segments are distributed among the boxes in service. FIG. 3D shows a data stream 340 representing a file or a majority of a file. The file 340 is divided into four segments 347-350. The segments 347-350 are created or formed by respectively sampling the file in a decimated manner. As a result, each of the segments includes a plurality of data blocks. Depending on an exact data length of the file 340, an n-th data block in each of the segments 347-350 is four successive data blocks in the file. In one embodiment, a data block comprises a chunk of data, for example, 256 Kbytes or 1 Mbyte.

As shown in FIG. 3D, the data stream 340 is expressed in data blocks as follows: b11, b21, b31, b41, b12, b22, b32, b42, b13, b23, b33, b43, . . . b1n, b2n, b3n, b4n. With the decimated sampling, the four segments 347-350 obtained can be respectively expressed as follows:

Segment 1={b11, b12, b13, b14 . . . b1n};
Segment 2={b21, b22, b23, b24 . . . b2n};
Segment 3={b31, b32, b33, b34 . . . b3n}; and
Segment 4={b41, b42, b43, b44 . . . b4n}, where b stands for "data block", numerals after "b" are mere reference numbers. As used above, the data blocks b11, b21, b31, b41, b12, b22, b32, b42, b13, b23, b33, b43, . . . bin, b2n, b3n, b4n are sequential while, for example, data blocks b11, b12, b13, b14 . . . bin in Segment 1 are not sequential. In other words, the data blocks in each of the segments are non-consecutive. Data streams from all segments must be multiplexed to reproduce useful data for playback.

Figure 4A:
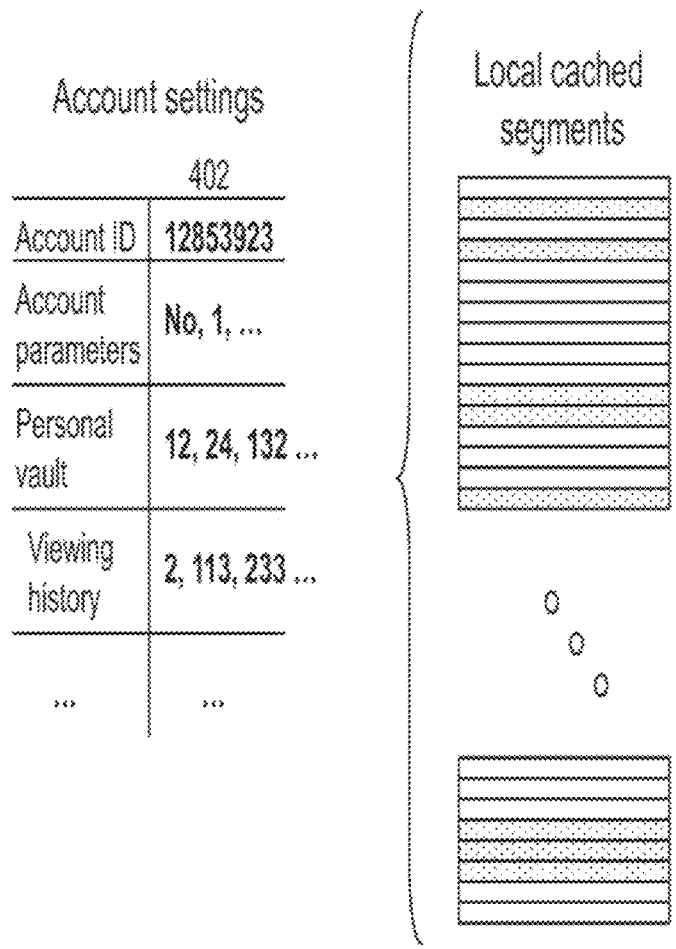
FIG. 4A shows an illustration of a personal settings table that includes a number of characters and numerals, according to one embodiment of the present invention.

According to one embodiment, FIG. 4A shows an illustration 400 of a personal settings table 402 that includes a number of characters and numerals. Depending on implementation, each of the characters and numerals pertains to one or more parameters that control an account associated with a subscriber. As an example as shown in FIG. 4A, an account ID 12853923 indicates an account associated with a subscriber. Numerals and characters No, 1, . . . may mean that the account is not restricted (i.e., "No" means that all titles are accessible), and the account is set up in category "1" which may mean that the account is in a box type one (e.g., a predefined storage size, a memory map, resolutions, a primary language, a time zone, etc.). Numerals or characters 12, 24, 132 . . . identify movies or segments locally cached for the movies in a personal vault in the primary box associated with the subscriber. Numerals or characters 2, 113, 233 . . . are identifiers of movies that the subscribers may have ordered or browsed. Other data not shown may include, but not be limited to, information about color of the graph user interface (GUI), classifiers determining what movies or commercial advertisements can be promoted, a list of movies the subscriber desires to watch or order or recommended by someone (e.g., a service provider based on past viewing habits or a guardian if the account is for a minor), or personal or audience ratings of the movies watched.

In one embodiment, a subscriber maintains a list of movies in a vault. These movies may have been purchased or rented and shall be available immediately. To make it possible to instantaneously access these movies, all segments pertaining to the movies are preferably locally cached for certain operations. The shaded segments as shown in FIG. 4A indicate those locally cached segments for movies in a vault. When the subscriber, for example, desires to make an optical disc (e.g., DVD) of a purchased movie in the vault, the disc could be made without causing the primary box to be connected to a server or a network for missing data. However, when the primary box is replaced by a new box or the subscriber logs into his/her account from another or a new box, a personal settings table associated with the subscriber shall be in the new box and personalize the new box for the subscriber within a few seconds.

In another case, a subscriber may have preordered a new release that is only available during a period. Before the order is fulfilled, the box is broken and has to be returned for replacement. When the replacement is received, the period of the release may have been over and the studio does not permit an electronic distribution of such a new release for another period of time. One of the features in the present invention is that the replacement box is loaded such a preordered release so that the subscriber would not miss anything while his/her primary box is being replaced or repaired.

Figure 4B:
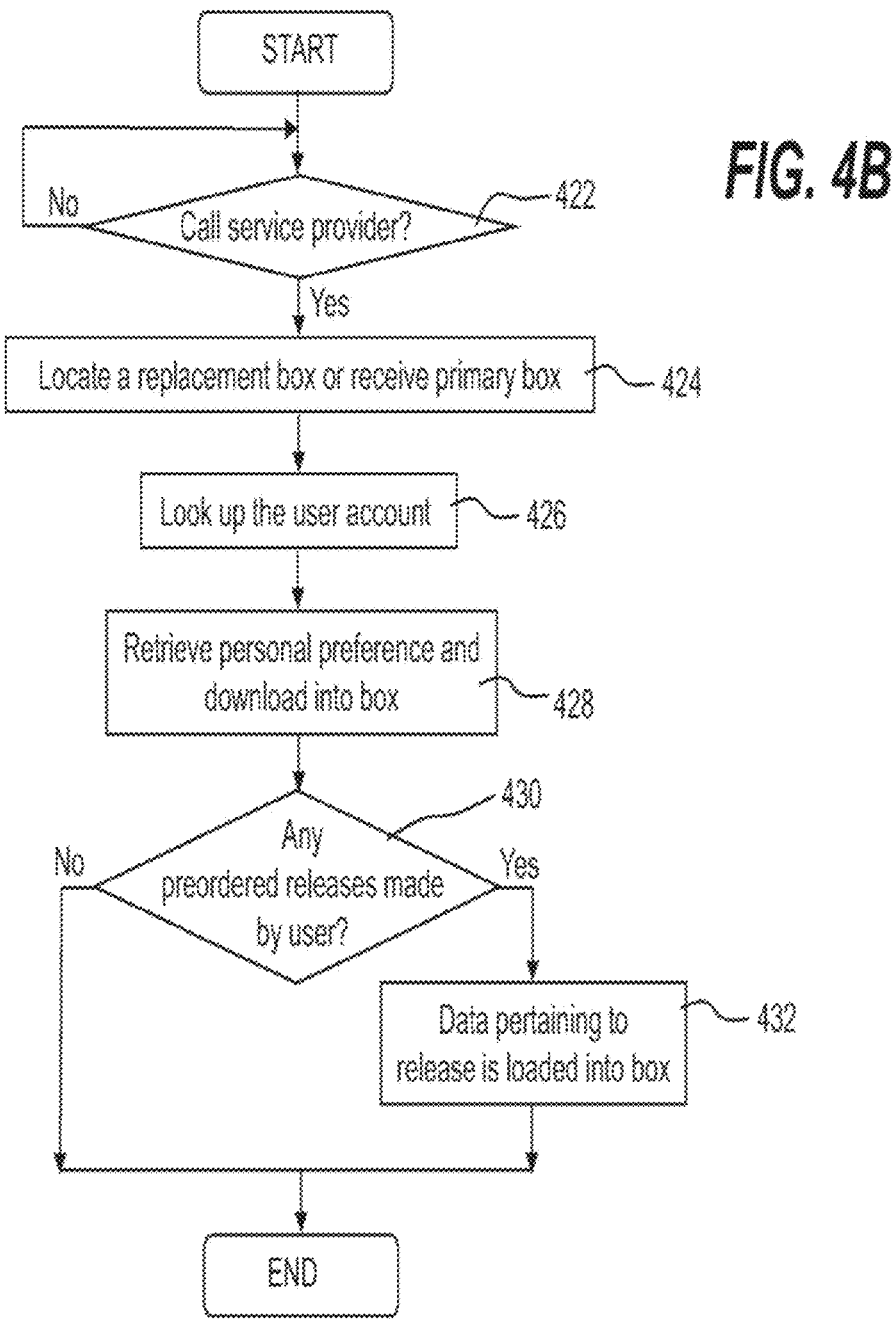
FIG. 4B shows a flowchart of distributing restricted media to end users.
Figure 4C:
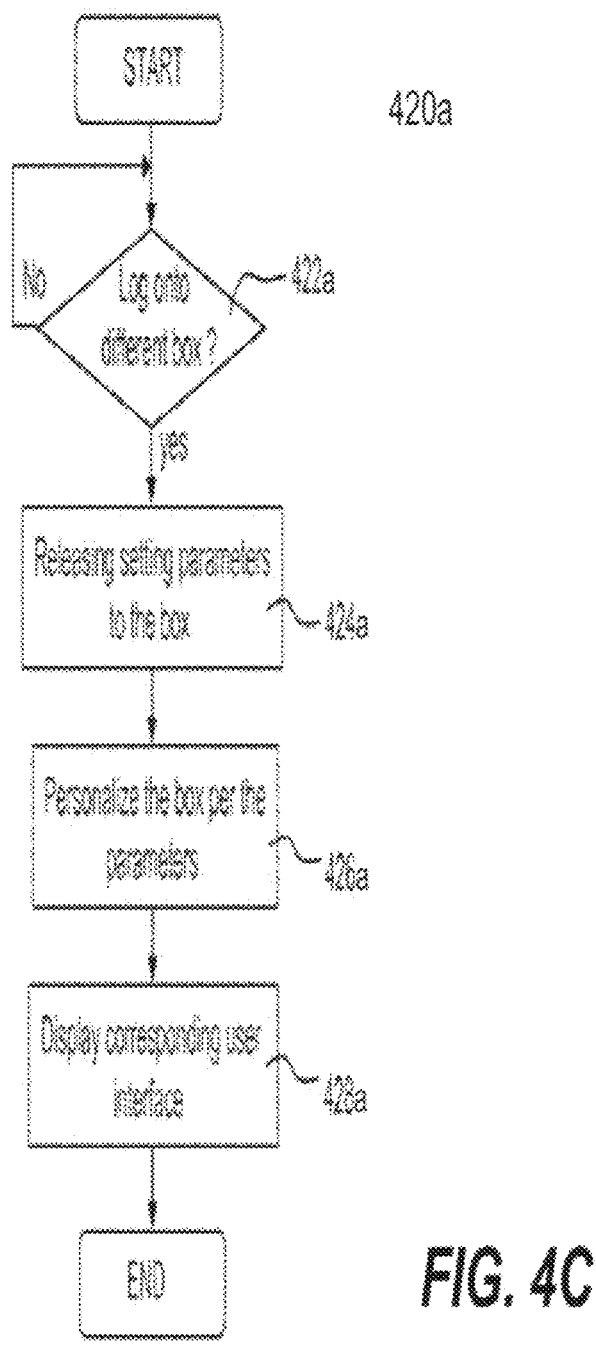

FIG. 4B shows a flowchart 420 of distributing restricted media to consumers according to one embodiment of the present invention. The process 420 may be implemented in software, hardware or a combination of both. According to one embodiment, a user noticed that his or her primary box is not working, thus had to call the service provider. It is assumed that the service provider agrees to replace the box by issuing a RMA (Return Material Authorization) at 422. The user may ship the box to a designated address provided by the service provider, and at the same time, the service provider starts the preparation of a replacement box in accordance with one embodiment of the present invention.

At 424, a replacement box is located or the primary box is received. In either case, it is considered a new box that needs to be personalized before it can be returned to the user. At 426, the user account is looked up. There are a number of things that need to be downloaded from a server to the new box. First of all, the new box needs to be identified by associating with an identifier. The identifier is used later for verification purpose and also used for providing data segments to other boxes that have ordered one or more titles, or even seeding data segments.

As described before, the server or the service provider keeps a copy of personal preference for the account associated with the user. The settings in the personal preference are retrieved and downloaded into the new box that is caused to personalize itself at 428. As a result, the new box is conditioned in accordance with the personal preference. In other words, when the user turns on the new box, the look and feel, as well as various lists, are unchanged.

It should be noted that there are other actions that may happen at 428. For example, if the user maintains a personal library that includes purchased titles, data for these titles shall be loaded into the new box so that next time when the box is turned on, the user would not be surprised that the purchased titles are missing. In addition, the box shall be seeded. One exemplary approach is described in co-pending and co-assigned U.S. application Ser. No. 11/075,573.

At 430, the process 420 determines if there are any preordered releases made by the user. If the subscriber has no pending order, the process 420 goes to end to ship the new box to the user. If the subscriber did order a new release that is now or likely to expire soon. The process 420 goes to 432. For example, a studio has announced that a new movie will be shown during May 1-May 7 during which all subscribers may watch or purchase the movie online through the service provider. However, before May 1, a box with a subscriber who has ordered the new release is noticed no longer working and a new box would not be received after May 7. To ensure that such a new release is still available for the subscriber after the original release time, data pertaining to the new release is loaded into the box as if it appears that the original order is fulfilled by the service provider. As a result, the new release can be played back once the new box is received by the user. One of the features in the process 420 is that subscribers would not miss any releases even if the releases are no longer permitted to be distributed online.

Referring now to FIG. 5A, there shows exemplary source information shown as a map 530 illustrating how a library of 5000 movie titles is distributed across N boxes. Column 532 lists all boxes in service. Each box is assigned a unique identifier for identification. Information in the column 532 may be viewed as the identifiers for the boxes in service. For example, box 1 is assigned a unique identifier of "Box 1" or a sequence of alphanumeric characters. The column 534 lists a corresponding IP address for each of the boxes listed in column 532. The Column 536 lists predetermined time-fill programs for all titles in the library. Depending on implementation, the time-fill programs may be identical or each of the time-fill programs is self-configured in accordance with what has been ordered. The column 538 lists what segments for title1 are residing in each of the boxes, assuming title1 is required to have two segments cached in each box. The column 540 lists what segment for title2 is residing in each of the boxes, assuming title2 is required to have one segment cached in each of the boxes. The column 542 lists what segment for title5000 is in a selected set of boxes, assuming title5000 is required to have one segment in these selected boxes. As a result, all segments in a box may be uniquely addressed for uploading to another box or playback of an ordered title locally.

FIG. 5B shows a source information map 550 corresponding to FIG. 5A. There are three other boxes 306-n, 306-3 and 306-1 designated to supply three needed segments that are together assembled with a locally cached segment to facilitate the playback of the ordered movie. It can be appreciated that relying on multiple sources to retrieve distributed segments to support a playback can be advantageously used in the architecture of current networks where the downloading bandwidth is typically a multiple of the uploading bandwidth.

FIG. 5C shows exemplary source information with backup boxes in a table 552 that includes a backup identifier (shown as an IP address) for each of the designated boxes. Should one of the boxes fail to respond to the request for a segment from the ordering box or the segment cannot be received correctly, the backup IP address is immediately called upon to switch to the corresponding backup box that is available to provide or continue to provide a segment that the originally designated box fails to provide.

Figure 6A:
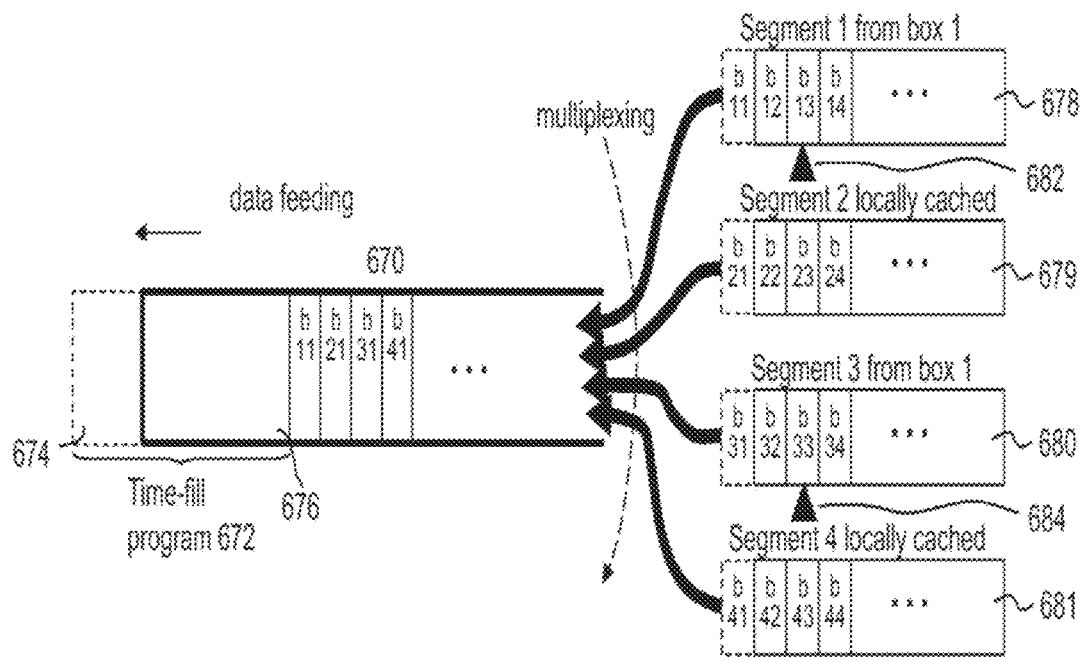
FIG. 6A, there shows an embodiment of an ordering box retrieving and assembling segments to support a playback of a selected movie.

Referring now to FIG. 6A, there shows an embodiment of an ordering box retrieving and assembling segments to support a playback of a selected movie. If all segments are streaming at predetermined minimum speeds, then, at 656, portions of the segments locally stored and the portions of the segments being streamed in are multiplexed into a buffer as shown in FIG. 6A. A portion 674 of the time-fill program 672 has been played out of the buffer 670. The remaining portion 676 of the time-fill program 672 is yet to be played. At the same time, the streaming of segments 678 and 680 is being fed into the buffer 670. Segments 678-681 (including the segments locally stored and the segments being streamed in) are multiplexed into the buffer 670. More specifically, a block of data from segment 1, a block of data from segment 2, a block of data from segment 3 and a block of data from segment 4 are multiplexed and successively fed into the buffer 670. As a result, the original order of the data is restored and the remaining portion of the file pertaining to the title is assembled.

To facilitate the continuation of a data stream, each of the pointers 682 and 786 is used to remember where the data block of a segment is being fed or about to be fed to the buffer 670. In the event, the segment being fetched from a box is interrupted and a backup box needs to step in, the ordering box knows exactly where to start fetching the segment from where it was interrupted in accordance with the pointer. Likewise, similar pointers (not shown) may be provided to remember where the data block of the locally cached segment is being fed or about to be fed to the buffer 670. In the event, the ordering box needs to be reset or is suddenly powered off and back on, these pointers can facilitate the continuation of the playback of the ordered movie.

Figure 6B:
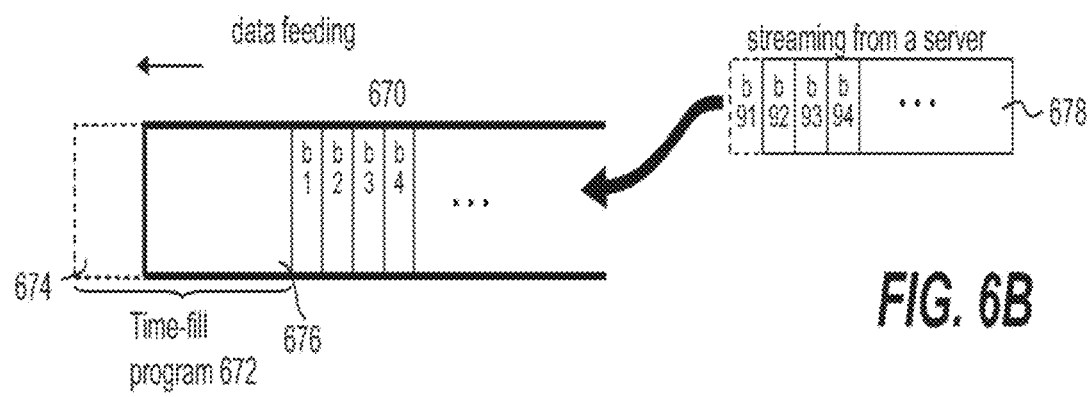
FIG. 6B shows an embodiment of an ordering box receiving streaming directly from a server.

FIG. 6B shows an embodiment of an ordering box receiving streaming directly from a server. Different from the multiplexing operation shown in FIG. 6A, the ordering box is configured to buffer the data of the streaming into the buffer 670 that is provided to minimize any possible instability or interruption of the streaming. In operation, once an order is placed, a time-fill program 672 is instantly played. At the same time, a data sequence from a server is being fetched and put into the buffer 670. As soon as the time-fill program 672 is done, the buffered portion of the data is started. Not shown in FIG. 6B, data pointers may be used in FIG. 6B to facilitate the continuation of the playback of the data in case the ordering box is accidentally out of operation and turned back on.

According to one embodiment in which the bandwidth of a network is sufficient enough, when a facility (e.g., a RMA facility of a service provider or a distribution of boxes) is called for a replacement of a box, such a replacement may be shipped out immediately. Upon receiving the replacement box, a user logs onto the box by entering a set of confidential information (e.g., a username and a password). Optionally, the user may insert a card into the box that reads off personalized data to facilitate the login process. The box is configured to send a request with the login information to a server.

Upon receiving the request, the server checks whether the user is an authorized subscriber. It is assumed that the user is authorized and the confidential information provided by the user is authenticated. The server is configured to look up the account and returns an acknowledgment to the box. Depending on implementation, the acknowledgement includes a copy of the personalized data that causes the box to be personalized, namely, the graphic environment and settings are restored in the replacement box. As a result, the user feels that the original box has been recovered.

If the box is not immediately used for ordering a title, data pertaining to the personal vault is immediately downloaded from a server, which may be paused for fulfilling an order if such an order is received from the user. If the user has ordered a new releases that is permitted to be distributed over a network, the data for the new release is fetched from a server to the box so that the user can play back when needed. One of the advantages and benefits in this embodiment is to reduce the complexity of configuring a replacement and also the cost associated with the RMS process.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for media distribution, the method comprising:

distributing, by a server, over an open network, a release title to a plurality of first devices upon occurrence of a release window associated with the release title;

determining, by a service provider, that a second device is expected to be received by a user after the release window; and in response to determining that the second device is expected to be received by the user after the release window, and prior to shipping the second device to the user, loading, by the service provider, the release title to the second device without the open network.

2. The method of claim 1, wherein unavailability of the second device is due to the second device being a replacement for a defective device.

3. The method of claim 2, further comprising loading, by the service provider, preferences associated with the defective device onto the second device.

4. The method of claim 3, wherein loading, by the service provider, the preferences associated with the defective device onto the second device comprises:
   detecting login of the first device to the server system using an identifier associated with the second device; and
   in response to detecting login of the first device using the identifier associated with the second device, downloading the preferences onto the second device.

5. The method of claim 2, further comprising loading, by the service provider, archived titles from the defective device onto the second device.

6. The method of claim 1, further comprising refraining from distributing over the open network the release title outside of the release window.

7. The method of claim 1, wherein the plurality of first devices and the second device are each coupled to separate display screens.

8. The method of claim 1, wherein the release title is a movie title.

9. The method of claim 1, further comprising distributing, by the service provider, decimated segments of cached titles to the plurality of first devices.

10. The method of claim 9, further comprising instructing, by the service provider, a portion of the plurality of first devices to stream the decimated segments to a requesting device.

11. A system for media distribution, the system comprising:
   a plurality of first devices having local storage and being operable to display content on a display screen;
   a second device having local storage and being operable to display content on a display screen; and
   a service provider programmed to:
      distribute over an open network, a release title to the plurality of first devices upon occurrence of a release window associated with the release title;
      determine that a second device is expected to be received by a user after the release window and that the user has ordered the release title; and
      in response to detecting that the second device is expected to be received by the user after the release window, that the user has ordered the release title, and that the second device has not yet been shipped to the user, loading the release title to the second device by the service provider without the open network.

12. The system of claim 11, wherein unavailability of the second device is due to the second device being a replacement for a defective device.

13. The system of claim 12, wherein the server operated by the service provider is further programmed to load preferences associated with the defective device onto the second device.

14. The system of claim 13, wherein loading the preferences associated with the defective device onto the second device comprises:
   detecting login of the first device to the server using an identifier associated with the second device;
   in response to detecting login of the first device using the identifier associated with the second device, downloading the preferences onto the second device.

15. The system of claim 12, wherein the server operated by the service provider is further programmed to load archived titles from the defective device onto the second device.

16. The system of claim 11, wherein the server operated by the service provider is further programmed to refrain from distributing over the open network the release title outside of the release window.

17. The system of claim 11, wherein the plurality of first devices and the second device are each coupled to separate display screens.

18. The system of claim 11, wherein the release title is a movie.

19. The system of claim 11, wherein the server operated by the service provider is further programmed to distribute decimated segments of cached titles to the plurality of first devices.

20. The system of claim 19, wherein the server operated by the service provider is further programmed to instruct a portion of the plurality of first devices to stream the decimated segments to a requesting device.

* * * * *